A. SCHMIDT.
Composition-Moldings.
No. 150,194. Patented April 28, 1874.
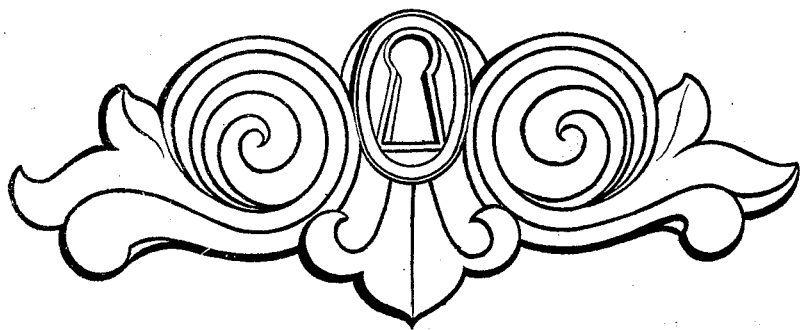
WITNESSES.
Frank Pardon
Chas. F. Lehmann
INVENTOR.
August Schmidt
By J. G. Hewitt
Attorney

UNITED STATES PATENT OFFICE.

AUGUST SCHMIDT, OF LOUISVILLE, KENTUCKY.

IMPROVEMENT IN COMPOSITION MOLDINGS.

Specification forming part of Letters Patent No. 150,194, dated April 28, 1874; application filed March 11, 1874.

*To all whom it may concern:*

Be it known that I, AUGUST SCHMIDT, of the city of Louisville, county of Jefferson and State of Kentucky, have invented a certain new and useful Improvement in Composition Moldings, to be used as ornaments on furniture or other similar purposes; and I do hereby declare that the following is a full, clear, and exact description thereof, which will enable others skilled in the art to make and use the same, reference being had to the accompanying drawing, forming part of this specification.

This my invention or process consists in taking common tan-bark, when ground fine, which constitutes the basis of the composition, and add to it about one-fourth as much ground egg-shells and about one-eighth as much slaked lime, more or less, as the necessity of the case may require, after which take a sufficient amount of common glue and linseed-oil mixed together in equal parts, and add sufficient of it to moisten the whole mass, so as to make it adhere together sufficiently to make it easily placed in the die or mold, which is made in a suitable form to hold it in place, after which a piece of veneering is placed over it of suitable wood, and a steam-heated die containing the desired impression is lowered on it, and forced down by means of hydraulic pressure, which completes the operation, after which it is taken out and permitted to cool, when it becomes dry and hard, ready for use. The object of this my invention is to provide a composition for making moldings that will not be liable to spring when exposed to the air or slight excess of heat, or that is easily decomposed by dampness or liable to be destroyed by vermin, which has been the case with nearly all the compositions now in use for a similar purpose.

I am aware that similar moldings or ornaments have been made of composition and pressed in a similar manner; but in nearly all previous cases they have proved a failure on account of the material of which they were composed, which was, at all times, liable to spring after being set, and to decompose from moisture and other causes. Therefore,

I claim as my invention—

1. A molding having a plastic base or body and a facing of veneer, pressed together into shape at one operation, as described.

2. The composition for moldings made of the ingredients and in the manner described.

AUGUST SCHMIDT.

Witnesses:
CHAS. S. LEHMANN,
HERBERT LOOMIS.